US 8,639,088 B2

(12) United States Patent
Choi et al.

(10) Patent No.: US 8,639,088 B2
(45) Date of Patent: Jan. 28, 2014

(54) DEVICE AND METHOD OF COLLECTING CONTENT PLAYBACK INFORMATION

(75) Inventors: Jun Kyun Choi, Daejeon (KR); Jinhong Yang, Daejeon (KR); Hyojin Park, Daejeon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 729 days.

(21) Appl. No.: 12/644,200

(22) Filed: Dec. 22, 2009

(65) Prior Publication Data

US 2011/0052151 A1 Mar. 3, 2011

(30) Foreign Application Priority Data

Aug. 26, 2009 (KR) ........................ 10-2009-0079204

(51) Int. Cl.
*H04N 9/80* (2006.01)

(52) U.S. Cl.
USPC ........................................................ 386/239

(58) Field of Classification Search
USPC ................... 386/200, 201, 239, 248, 353
See application file for complete search history.

(56) References Cited

U.S. PATENT DOCUMENTS

| 2004/0143661 | A1* | 7/2004 | Higashi et al. ............... 709/224 |
| 2004/0151475 | A1* | 8/2004 | Taira et al. ..................... 386/95 |
| 2006/0269227 | A1* | 11/2006 | Hsieh .............................. 386/95 |
| 2008/0155116 | A1* | 6/2008 | Schmelzer .................... 709/232 |
| 2008/0222546 | A1* | 9/2008 | Mudd et al. ................... 715/765 |
| 2009/0019240 | A1* | 1/2009 | Kawasaki ..................... 711/154 |

FOREIGN PATENT DOCUMENTS

| KR | 10-2004-0039952 A | 5/2004 |
| KR | 10-2006-0093296 A | 8/2006 |

OTHER PUBLICATIONS

Korean Office action for 10-2009-0079204 dated Mar. 18, 2011.

* cited by examiner

*Primary Examiner* — Tat Chio
(74) *Attorney, Agent, or Firm* — Pearne & Gordon LLP

(57) ABSTRACT

An end device that collects content playback information of a user may be provided. The end device including: a storage to store content and a table including playback information of the content in a predetermined local storage address; a control unit to retrieve content, selected by the user, from the storage, to load a storage address of the selected content, and to transmit the storage address to a decoder; and the decoder to store the storage address in the table, to change playback information of the selected content, and to decode the selected content based on the storage address.

10 Claims, 6 Drawing Sheets

DEVICE AND METHOD OF COLLECTING CONTENT PLAYBACK INFORMATION

CROSS-REFERENCE TO RELATED APPLICATION

This application claims the benefit of Korean Patent Application No. 10-2009-0079204, filed on Aug. 26, 2009, in the Korean Intellectual Property Office, the disclosure of which is incorporated herein by reference.

BACKGROUND OF THE INVENTION

1. Field of the Invention

The present invention relates to a device and method of collecting content playback information that may play content without connecting to a server that provides the content, and collect content playback information.

2. Description of the Related Art

In a content consumption method using a network in a conventional art, a user may play content, downloaded from a server, using a communication terminal connected to the server providing the content, or may be provided with content played by the server through streaming when connected to the server.

Accordingly, a content provider may ascertain content consumption propensity of users based on the number of users provided with content through streaming, or based on the number of downloads.

However, the number of portable devices playing content without access to a server may increase due to the development of a variety of portable devices. Accordingly, an amount of content consumed may not be predicted based on the number of downloads or the number of users provided with content through streaming.

Thus, a system and method that may collect and provide a content provider with a content play state in devices, which are not connected to a server, are desired.

BRIEF SUMMARY

An aspect of the present invention provides a system and device where each device of a user may collect information about content playback, and where a terminal, connected to the device, may store the information about the content playback to store content in the device and thus, the user or a content provider may be provided with information about a playback time or a playback count for each content.

According to an aspect of the present invention, there is provided a system of collecting content playback information for each end device of a user, the system including: an end device to play stored content, and when the content is played, to store playback information that the content is played; and a communication terminal to be connected to the end device, to store the content, provided from a server, in the end device when connected to the end device, to receive playback information, stored in the end device, to sort and store the received playback information for each end device, and to transmit the playback information, sorted and stored for each end device, to the server.

Also, according to an aspect of the present invention, there is provided an end device of collecting content playback information of a user, the end device including: a storage to store content and a table including playback information of the content in a predetermined local storage address; a control unit to retrieve content, selected by the user, from the storage, to load a storage address of the selected content, and to transmit the storage address to a decoder; and the decoder to store the storage address in the table, to change playback information of the selected content, and to decode the selected content based on the storage address.

Also, according to an aspect of the present invention, there is provided a method of collecting content playback information of a user, the method including: storing playback information about content playback in an end device, when content is played; receiving, by a communication terminal, the playback information, stored in the end device, when the end device is connected to the communication terminal, sorting and storing the playback information for each end device; and providing, by the communication terminal, a server or a user with the stored playback information.

Also, according to an aspect of the present invention, there is provided a method of collecting content playback information of a user, the method including: storing contents, and generating a table including playback information of the contents in a predetermined local storage address; receiving information of content selected by a user; retrieving the content, selected by the user, from the contents stored when the table is generated, based on the information of the selected content, and loading a storage address of the selected content; transmitting the storage address of the selected content to a decoder; storing the storage address in the table, and changing playback information of the selected content; and decoding the selected content based on the storage address.

According to the present invention, each device of a user may collect information about content playback and thus, the user or a content provider may be provided with information about a playback time or a playback count for each content.

Also, according to the present invention, a user may combine a device with (*connect a device to a personal media station of the user, information about content playback, collected by the device, may be stored in the personal media station for each device when storing or deleting content, and the information may be mapped for each content and thus, the user or a content provider may be provided with information about a playback time or a playback count for each content.

Also, according to the present invention, a server providing content may sort, combine, or map information, which is provided by a personal media station of a user, about a playback time or a playback count for each content and thus, a content provider may be provided with statistics of a playback count of the provided content or information about content provided for each user.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
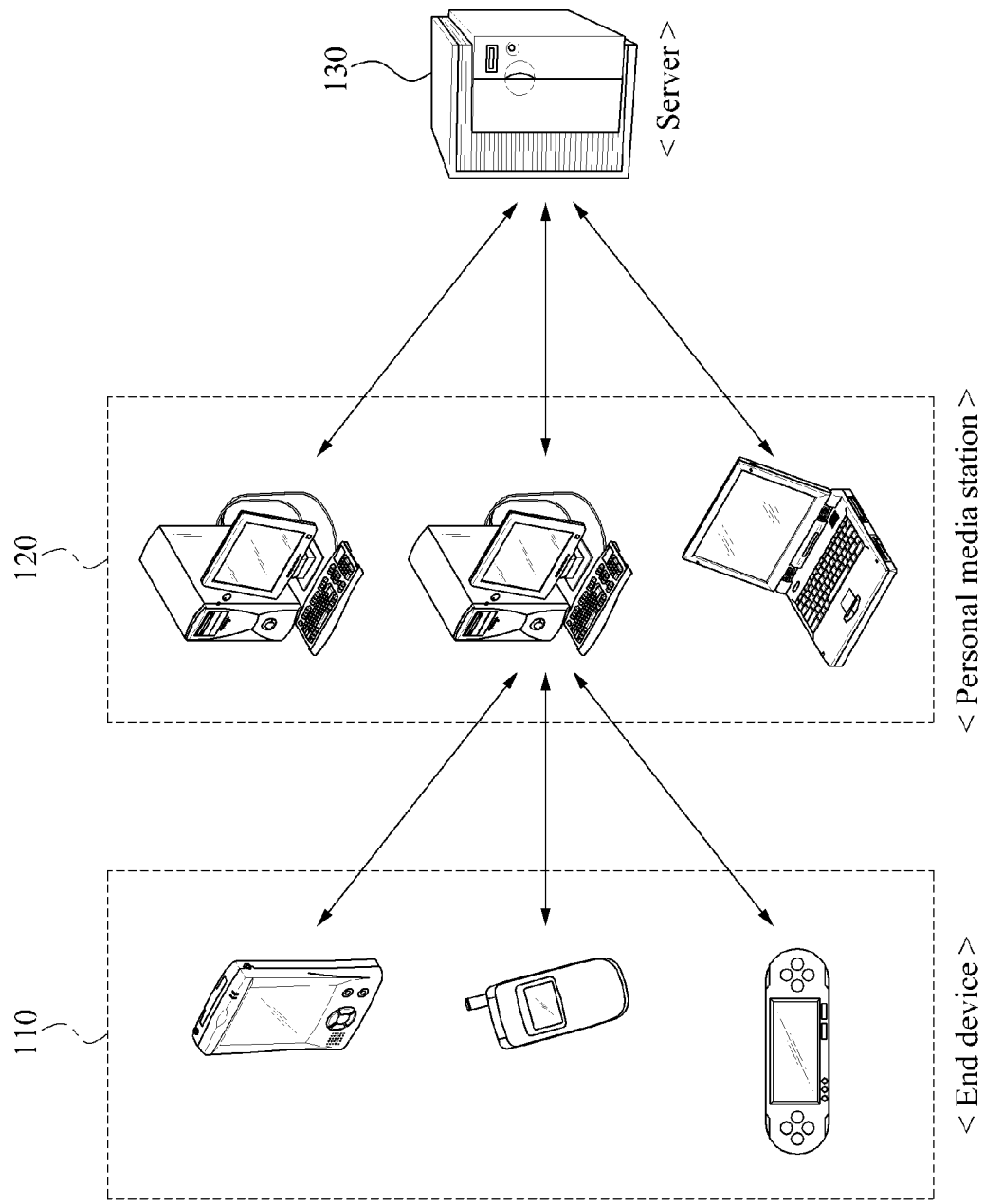
FIG. 1 is a diagram illustrating an example of a system of collecting content playback information for each device of a user according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

According to an exemplary embodiment of the present invention, end devices, consuming content provided by a server without connecting to the server, may collect playback information of the content, played in each of the end devices. A personal media station may receive the playback information, collected by the end devices, from an end device which is connected to store content. Accordingly, a user may ascertain information about content, played in all end devices of the user, and provide the server with the information about the content.

FIG. 1 is a diagram illustrating an example of a system of collecting content playback information for each device of a user according to an exemplary embodiment of the present invention.

The system may include an end device 110, a personal media station 120, and a server 130. In this instance, a plurality of end devices 110 and personal media stations 120 may be included in the system as illustrated in FIG. 1.

The end device 110, possessed by the user, may store content, play the content according to a request from the user, and collect playback information associated with the content playback.

In this instance, the playback information that may be collected by the end device 110 may include at least one of a playback count for each content, stored in the end device 110, and a playback time for each content, and a total playback time of all the contents having been played.

The end device 110 may be a device capable of storing and playing content, and be any one of a Portable Media Player (PMP), a portable terminal, a notebook computer, and a Moving Picture Experts Group (MPEG) Audio-Layer 3 (MP3) player.

An operation of the end device 110 is described in detail with reference to FIGS. 3 and 4.

The personal media station 120 may be connected to the end device 110 and obtain content playback information for each end device 110. That is, each of the personal media stations 120 may be connected to each of the end devices 110, obtain the playback information of each of the end devices 110, and generate playback information for each content of the user by combining the obtained playback information. In this instance, the personal media station 120 may provide the user with the generated playback information for each content of the user.

Also, the personal media station 120 may download content from the server 130, and transmit the downloaded content to the connected end device 110. Also, the personal media station 120 may transmit the generated playback information for each content of the user to the server 130.

Also, when the user connects the end device 110 to the personal media station 120, and stores or deletes content, the personal media station 120 may synchronize the playback information, collected by the end device 110, and store the playback information for each end device.

The personal media station 120 may be accessible to a wired/wireless network to connect to the server 130, and be a communication terminal that may be connected to and synchronized with the end device 110 such as a Personal Computer (PC), a notebook computer, and the like. In this instance, the personal media station 120 may be a communication terminal where a system of obtaining content playback information for each device of a user is installed according to a permission of the user. Here, the personal media system may obtain content playback information of a device.

Also, the system of obtaining content playback information for each device of a user may include a program that may be connected to the end device 110 and obtain the content playback information for each end device, a program that may provide the end device 100 with content, a program that may combine playback information and generate playback information for each content of a user, and a program that may transmit the playback information for each content of the user to the server 130.

The personal media station 120 may determine whether the content, included in the playback information for each content of the user, is legitimately provided from the server 130 in connection with the server 130, and may include a result of determining in the playback information for each content of the user.

An operation of the personal media station 120 is described in greater detail with reference to FIGS. 5 and 6.

The server 130 may store content, and transmit the content according to a request from the personal media station 120. Also, the personal media station 120 may generate information about content playback for each user and total playback information for each content, based on playback information for each content transmitted from the personal media station 120. Here, the information about content playback for each user may be information about content played by the user possessing the personal media station 120, and the total playback information for each content may indicate total content played by all users.

Specifically, the server 130 may obtain the information about content playback for each user by storing the playback information for each content, transmitted from the personal media stations 120, for each personal media station 120. Also, the server 130 may map contents in the information about content playback for each user, add values of the contents, played for each user, and thereby may generate the total playback information for each content as the added value.

Figure 2:
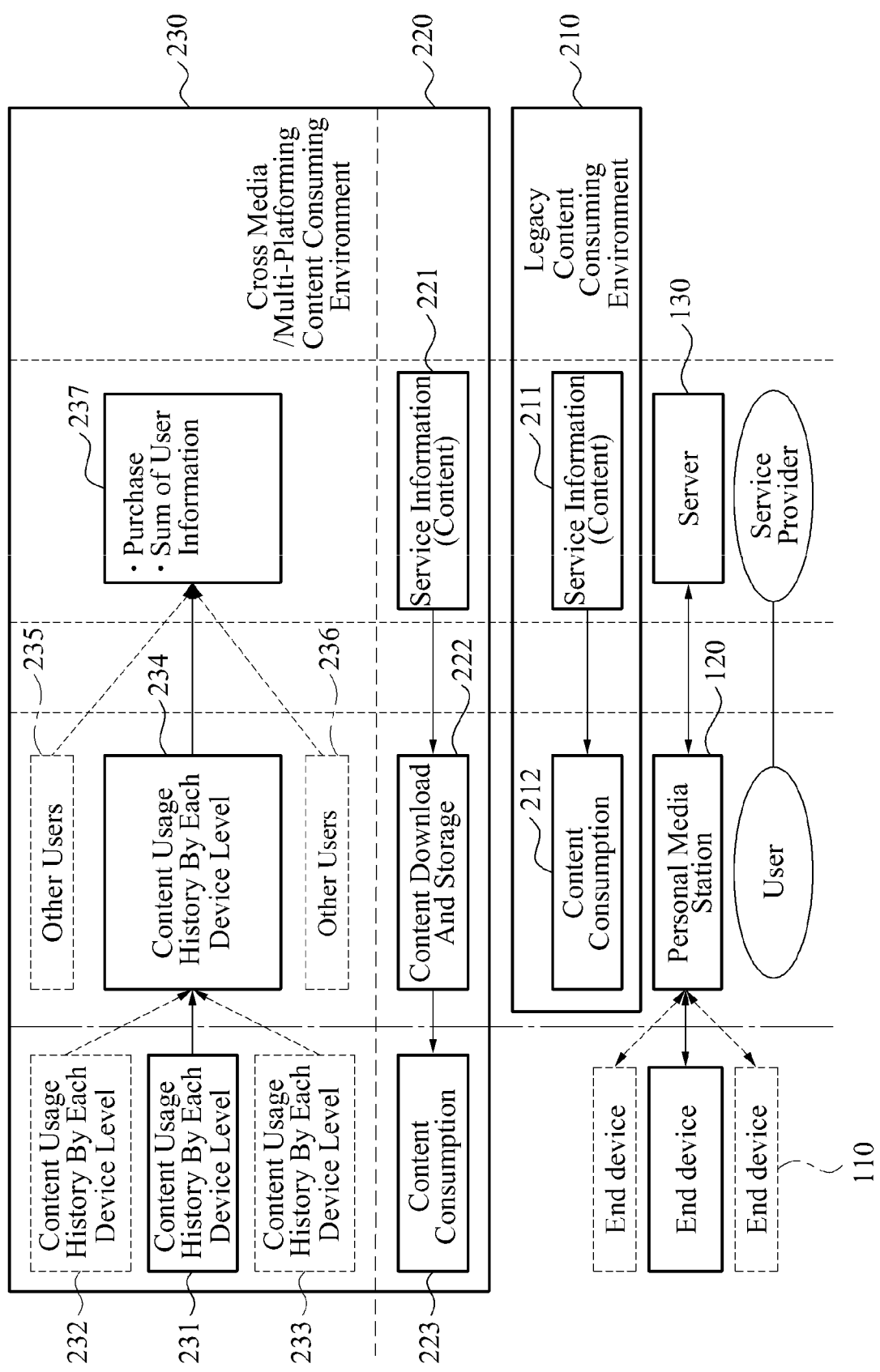
FIG. 2 is a diagram illustrating an example of operations of a system of collecting content playback information for each device of a user according to an exemplary embodiment of the present invention.

FIG. 2 is a diagram illustrating an example of operations of a system of collecting content playback information for each device of a user according to an exemplary embodiment of the present invention.

A legacy content consuming environment 210 may be a content consuming environment in a conventional art, and be associated with when content, produced by a content provider, may be played in only the personal media station 120.

In this instance, the server 130 may store content 211 which is service information, and the user may use the content 211 through streaming in the personal media station 120 through a network provided by a network provider, or through downloading.

Conversely, a cross media/multi-platforming content consuming environment may be a content consuming environment of a system of collecting content playback information for each device of a user according to an exemplary embodiment of the present invention. Also, the cross media/multi-platforming content consuming environment may be associated with when content, produced by a content provider, may be played in each end device 110 of the user. Also, the cross media/multi-platforming content consuming environment may include a download operation 220 to store content in the end device 110, and a collection operation 230 to collect content playback information from the end device 110.

In the download operation 220, the user may download and store the content 221, stored in the server 130, in the personal media station 120 through a network, or the server 130 may transmit the content 221 to the personal media station 120 through podcasting based on setting of the user.

In this instance, the personal media station 120 may store the downloaded or transmitted content 221 in the end device 110 through synchronization with the connected end device 110, in operation 222.

In this instance, the end device 110 may store the content 221 by being connected to the personal media station 120 by the user, and be synchronized with the personal media station 120, or download and store the content 221 from the personal media station 120.

Also, the end device 110 may consume the content 221 by playing and providing the content 221 to the user, in operation 223.

In the collection operation 230, every time the end device 110 consumes the content 221, the end device 110 may update and store a content usage history by each device level 231, 232, and 233. In this instance, the content usage history by each device level 231, 232, and 233 may include at least one of a playback count of the content 221, a playback time that the content 221 is played, and a play frequency that the content 221 is played.

The personal media station 120 may receive the content usage history by each device level 231, stored in the end device 110, from the end device 110 which is connected to store the content 221. In this instance, the personal media station 120 may receive any one of the content usage history by each device level 231, 232, and 233 for each end device 110.

Also, the personal media station 120 may store a content usage history by personal level 234, 235, and 236 including at least one of the content usage history by each device level 231, 232, and 233, synchronization information, and download information. Here, the synchronization information may indicate whether the content 221 is synchronized with the end device 110 and stored, and the download information may indicate whether the content 221 is downloaded from the end device 110 and stored.

The server 130 may receive the content usage history by personal level 234, 235, and 236 from the personal media station 120, and determine information about purchase of the content 221 or aggregate user information, in operation 237.

Figure 3:
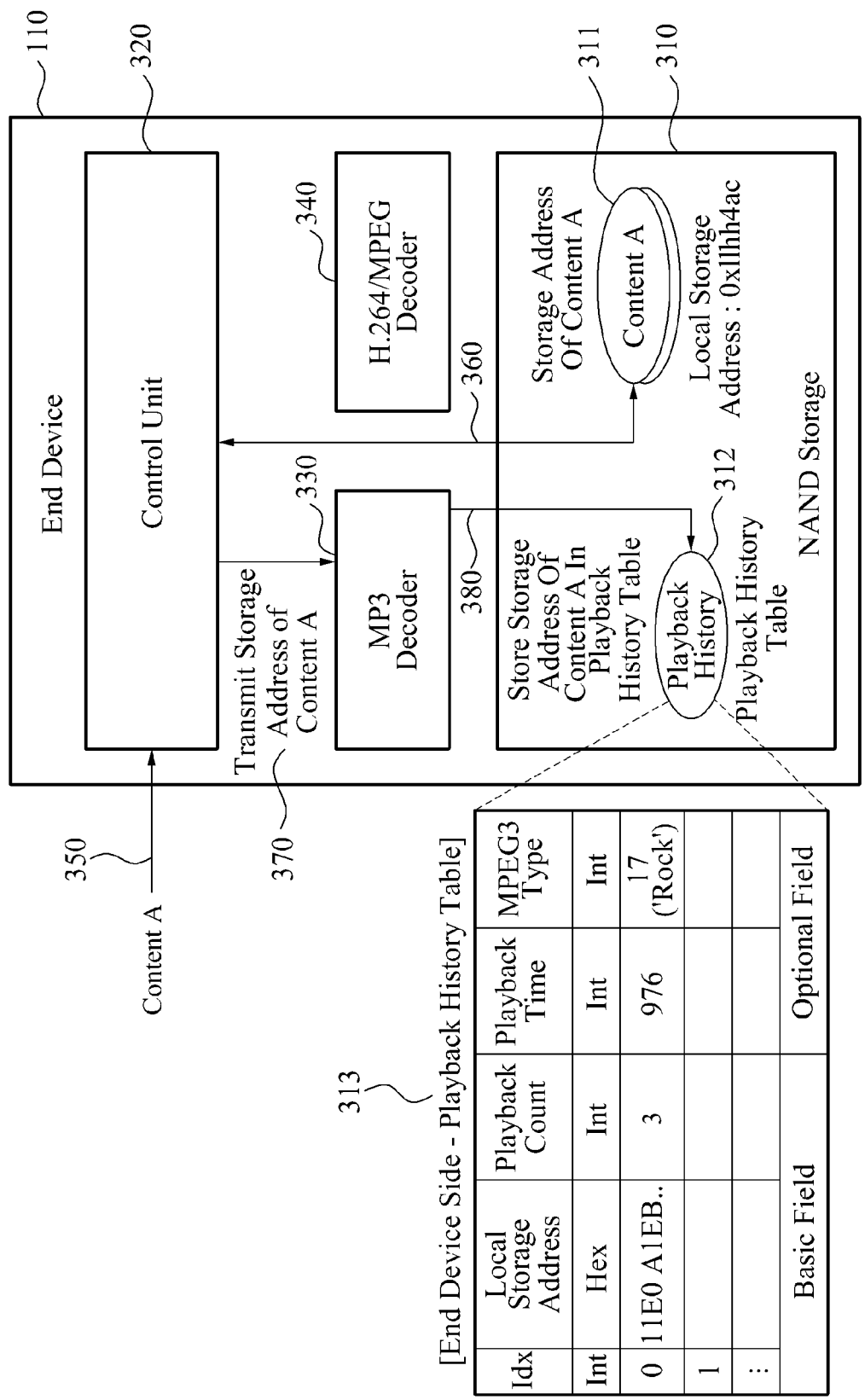
FIG. 3 is a diagram illustrating an example of a configuration and operations of an end device according to an exemplary embodiment of the present invention.

FIG. 3 is a diagram illustrating an example of a configuration and operations of the end device 110 according to an exemplary embodiment of the present invention.

The end device 110 may include a storage 310, a control unit 320, an MP3 decoder 330, and an H.264/MPEG decoder 340, as illustrated in FIG. 3.

Hereinafter, the configuration is described in detail.

The storage 310, which is a NAND storage 310, may store content A 311 and a table 312 including playback information about content playback.

In this instance, as illustrated in an example 313 of the table 312, the playback information about content playback may include at least one of a local storage address of the content A 311, a playback count, and a playback time that the content A 311 is played.

Also, a Playback History Table (PHT) may be generated when the MP3 decoder 330 or the H.264/MPEG decoder 340 designates (*assigns a particular address value of the storage 310. The PHT may include information about playback history of the content.

The control unit 320 may load a storage address of content A, selected by a user in the storage 310, and transmit the storage address to the MP3 decoder 330 or the H.264/MPEG decoder 340. In this instance, the control unit 320 may select a decoder to transmit the storage address from the MP3 decoder 330 and the H.264/MPEG decoder 340 depending on the selected content A.

Specifically, the control unit 320 may receive information about the selected content A from the user in operation 350. Also, the control unit 320 may retrieve the selected content A from the storage 310 based on the information about the selected content A and load the storage address of the selected content A in operation 360. Also, the control unit 320 may transmit the storage address to the MP3 decoder 330 or the H.264/MPEG decoder 340 in operation 370.

In this instance, the storage address, loaded by the control unit 320, may be a local storage address of the selected content A.

The control unit 320 may be configured as a firmware or a chipset, and assign a storage address of the storage 310 based on a feature of the end device 110.

When the end device 110 is initialized, the control unit 320 may partition the storage 310, assign addresses, and request the MP3 decoder 330 or the H.264/MPEG decoder 340 to generate the PHT.

The MP3 decoder 330 or the H.264/MPEG decoder 340 may store the storage address of the content A in the PHT in operation 380, and decode the selected content A based on the storage address of the content A.

In this instance, when the address to be stored is not stored in the PHT, the MP3 decoder 330 or the H.264/MPEG decoder 340 may add the address as a new address. When the address to be stored is stored in the PHT, the MP3 decoder 330 or the H.264/MPEG decoder 340 may increase a storage count of the storage address stored in the PHT. In this instance, the storage count may correspond to the storage address, and be a playback count of content stored in the storage 310.

Also, the MP3 decoder 330 or the H.264/MPEG decoder 340 may store information about a point in time the storage address of the content A as well as the storage address of the content A are stored. In this instance, the information about the point in time may correspond to the storage address and be a playback time that the stored content is played.

The MP3 decoder 330 or the H.264/MPEG decoder 340 may be a chipset where an instruction to store playback information is installed. Also, when the end device 110 is initialized, the MP3 decoder 330 or the H.264/MPEG decoder 340 may generate a PHT in a particular address value of the storage 310 according to a request from the control unit 320.

In this instance, an address value used by the PHT may be in a range of 256 Kb to 2 Mb. Also, the particular address value may be set differently depending on the feature of the end device 110.

Also, the MP3 decoder 330 or the H.264/MPEG decoder 340 may be replaced with another decoder depending on the end device 110 and the content A 311.

Hereinafter, operations of the end device 110 are described in detail.

The end device 110 may receive a request of playing the selected content A and information about the selected content A from the user. Specifically, the control unit 320 may receive a command to select and play the content A from the user in operation 350.

In operation 360, the control unit 320 may retrieve a local storage address of the content A from the storage 310 based on the received command, and load the local storage address.

In operation 370, the control unit 320 may transmit the loaded local storage address of the content A to the MP3 decoder 330 that may decode the content A.

In operation 380, the MP3 decoder 330 may store the transmitted local storage address of the content A in the PHT. Also, the MP3 decoder 330 may store information about the point in time that the local storage address of the content A is stored.

Subsequently, the MP3 decoder 330 may decode the content A, stored in the storage 310, based on the local storage address of the content A, and thereby may provide the user with the selected content.

Figure 4:
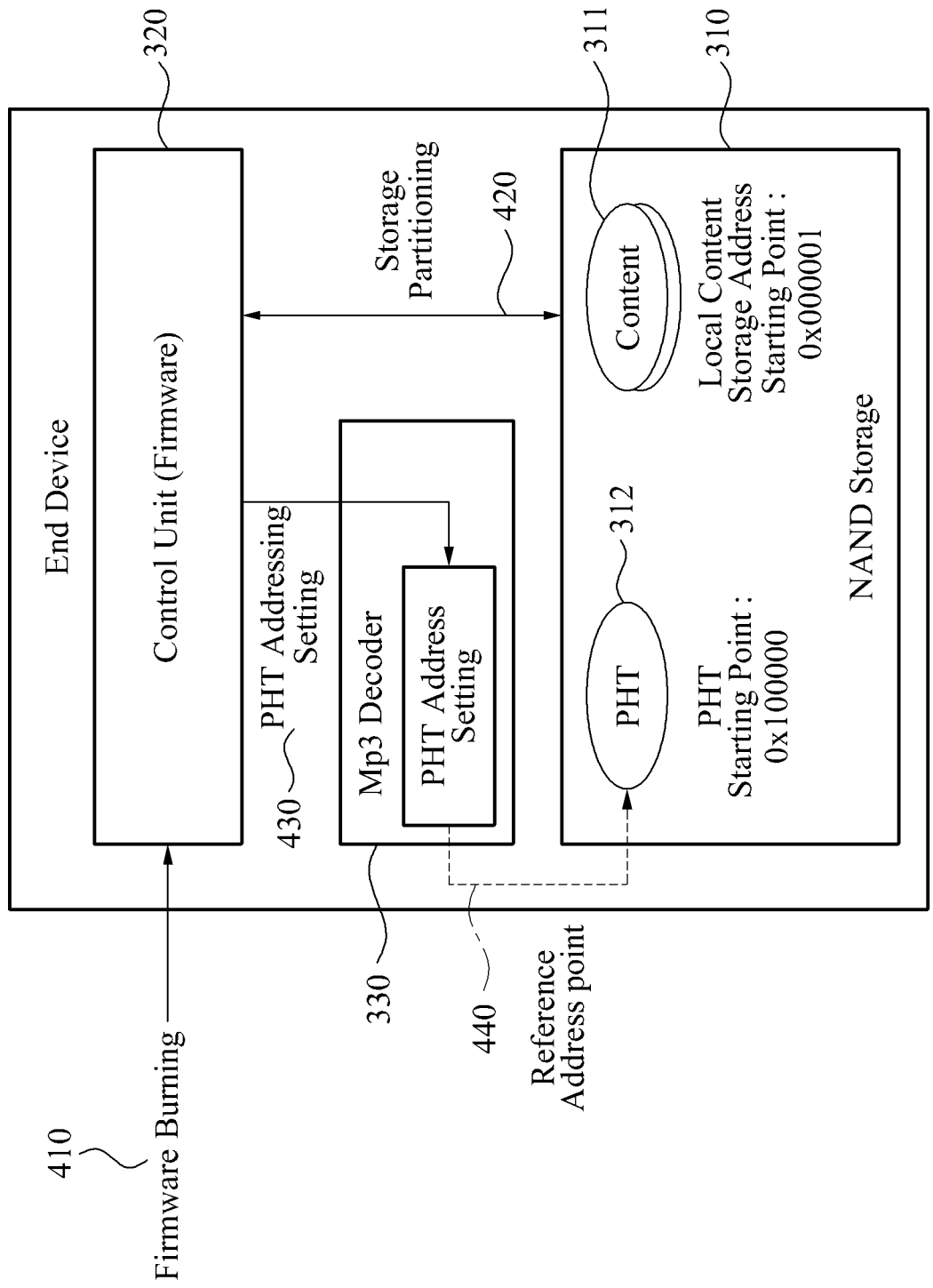
FIG. 4 is a diagram illustrating an example of operations of Playback History Table (PHT) addressing in an end device according to an exemplary embodiment of the present invention.

FIG. 4 is a diagram illustrating an example of an operation of PHT addressing in an end device according to an exemplary embodiment of the present invention.

FIG. 4 illustrates the example of PHT addressing operation in the MP3 decoder 330 when the control unit 320 is configured as a firmware.

In operation 410, a manufacturer of the end device 110 or a user may input firmware burning in the control unit 320 to initialize the end device 110. In operation 420, the control unit 320 may partition the storage 310 and assign addresses.

In operation 430, the control unit 320 may perform PHT addressing setting, and perform transmission to the MP3 decoder 330.

In operation 440, an instruction, included in the MP3 decoder 330, may receive the PHT addressing setting, a PHT address may be set based on the received PHT address setting, a reference address point may be transmitted to the storage 310, and a PHT 312 may be generated.

Figure 5:
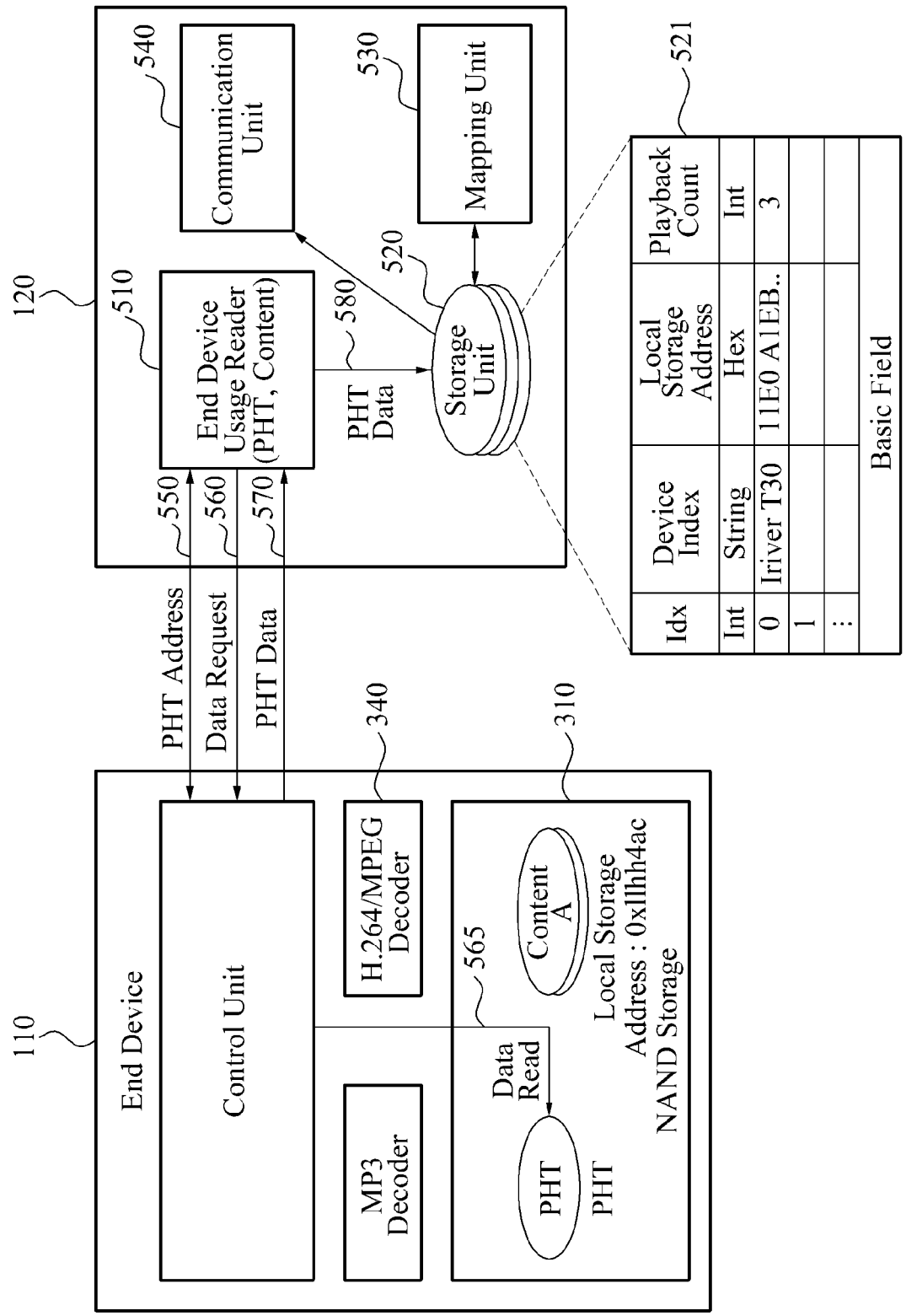
FIG. 5 is a diagram illustrating an example of a configuration of a personal media station and operations between the personal media station and an end device according to an exemplary embodiment of the present invention.

FIG. 5 is a diagram illustrating an example of a configuration of a personal media station and operations between the personal media station 120 and an end device according to an exemplary embodiment of the present invention.

The personal media station 120 may include an end device usage reader 510, a storage unit 520, a mapping unit 530, and a communication unit 540 as illustrated in FIG. 5.

Hereinafter, the configuration is further described.

The end device usage reader 510 may be synchronized with the connected end device 110, and obtain playback information of the end device 110. In this instance, the end device usage reader 510 may further obtain content information of content stored in the end device 110.

Specifically, the end device usage reader 510 may request the end device 110 for PHT data in operation 560. In operation 570, the PHT data may be transmitted to the end device 110. In operation 580, the end device usage reader 510 may sort the received PHT data by each item of end device 110, and store the PHT data in the storage unit 520.

In this instance, the PHT data may include at least one of a local storage address of content stored in the storage 310, a playback count of the content, and a playback time that the content is played.

Also, the end device usage reader 510 may request the end device 110 for information about the content. When the information about the content is transmitted by the end device 110, the end device usage reader 510 may sort the transmitted information for each end device 110, and store the information in the storage unit 520.

In this instance, the content information may include the local storage address, identification information, and metadata of the content stored in the end device 110.

The storage unit 520 may sort the playback information and the content information for each end device 110, and store the playback information and the content information. Also, the storage unit 520 may store playback information for each content of a user. The playback information for each content of the user may include information about playback of corresponding content for each content. In this instance, the storage unit 520 may store the playback information and the content information in a form of PHT, as illustrated in an example 521.

Also, the storage unit 520 may store content downloaded from the server 130.

In this instance, the playback information for each content of the user may include at least one of identification information of each content, information about a point in time that the content is downloaded from the server 130, a sum of playback counts that the content is played in the end device 110, and a sum of playback times that the content is played in the end device 110.

In this instance, the sum of playback times that the content is played in the end device 110 may be calculated based on the sum of playback counts that the content is played in the end device 110 and a total play time of the content. When the end device 110 includes an MP3 decoder that additionally stores information about a decoding end time in the PHT, the sum of playback times that the content is played in the end device 110 may be calculated based on a point in time that the content, stored in the storage 310, is played and information about the decoding end time.

The mapping unit 530 may map the playback information and the content information, determine playback information for each content in the end device 110, and generate playback information for each content of a user based on the playback information for each content in the end device 110.

Specifically, the mapping unit 530 may map a local storage address of the playback information and a local storage address of the content information, and determine the playback information for each content in the end device 110. Here, the playback information for each content in the end device 110 may include at least one of the identification information, the playback count, and the playback time of the content stored in the end device 110.

In this instance, when the playback information for each content of the user includes content corresponding to the identification information, the mapping unit 530 may add a playback count of the content corresponding to the identification information to a playback count of the playback information for each content in the end device 110.

A mapping method of the mapping unit 530 is described in greater detail with reference to FIG. 6.

The communication unit 540 may download content from the server 130, and store the content in the storage unit 520. Also, the communication unit 540 may transmit the playback information for each content of the user or the playback information for each content in the end device 110, which are determined by the mapping unit 530, and user identification information to the server 130. Accordingly, the communication unit 540 may enable the server 130 to obtain information about content playback for each user.

Hereinafter, the operations of the personal media station 120 are described in detail.

In operation 550, the end device usage reader 510 may request the control unit 320 of the end device 110 for a PHT address, and receive the PHT address stored in the storage 310 from the control unit 320. Here, the end device 110 may be connected to the personal media station 120.

In operation 560, the end device usage reader 510 may request the control unit 320 for PHT data based on the PHT address.

In operation 570, the control unit 320 may load the PHT data from the storage 310 according to the request from the end device usage reader 510, and transmit the PHT data to the end device usage reader 510.

In operation 580, the end device usage reader 510 may sort the received PHT data for each end device 110, and store the PHT data in the storage unit 520.

Also, the end device usage reader 510 may request the control unit 320 for the content information, and receive and store the content information in the storage unit 520 in a same manner as the operation of receiving and storing the PHT data.

Specifically, the end device usage reader 510 may load identification information and local storage address of content stored in the storage 310, and receive the content information from the control unit 320. Also, the end device usage reader 510 may sort the content information transmitted by the end device 110, and store the content information.

Also, the mapping unit 530 may map a local storage address of the playback information, stored in the storage unit 520, and a local storage address of the content information, and determine the playback information for each content including at least one of the identification information, the playback count, and the playback time.

Figure 6:
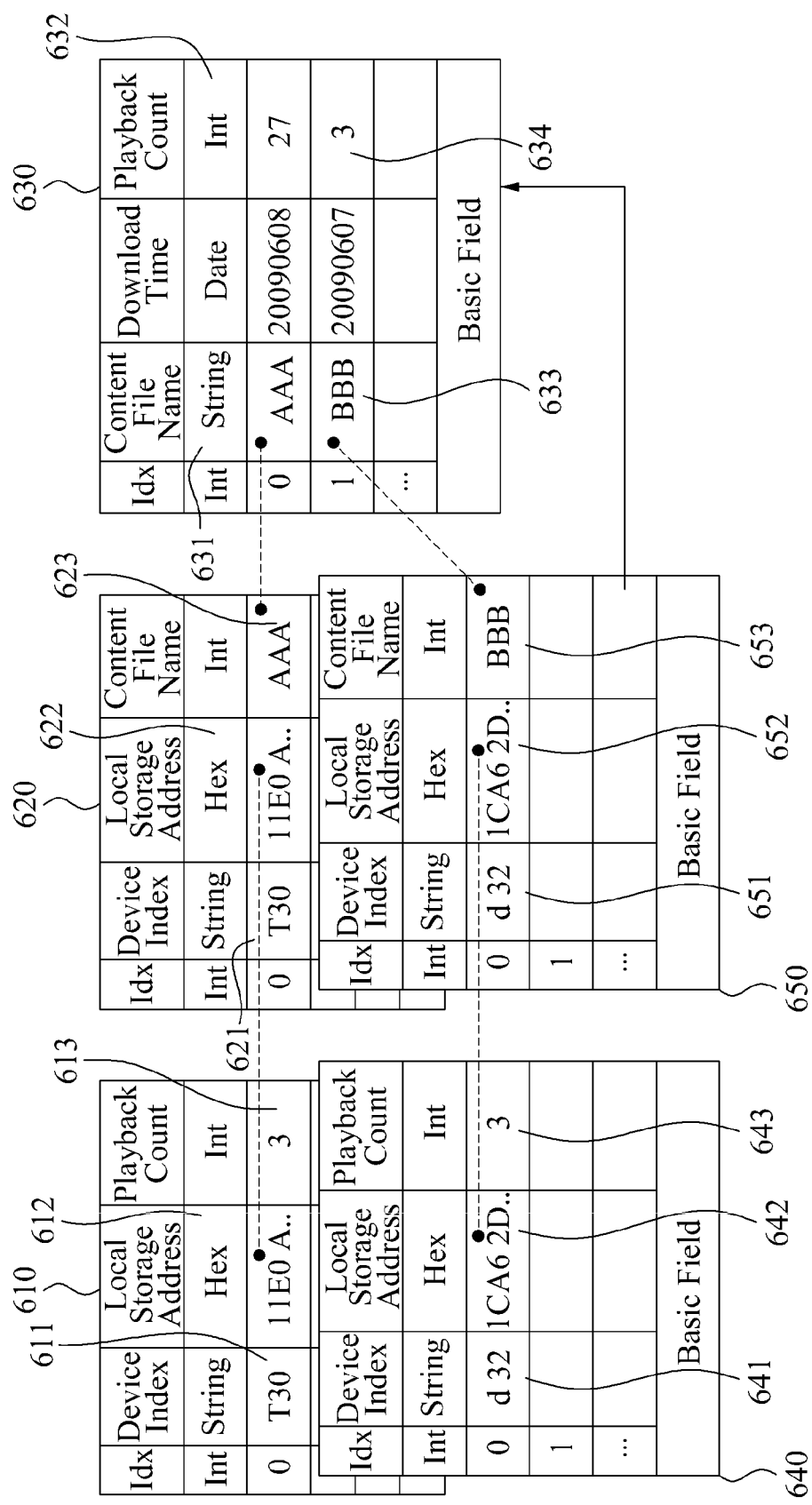
FIG. 6 is a diagram illustrating an example of an operation of mapping playback information with content information according to an exemplary embodiment of the present invention.

FIG. 6 is a diagram illustrating an example of an operation of mapping playback information with content information according to an exemplary embodiment of the present invention.

FIG. 6 illustrates the example where the mapping unit 530 generates playback information 630 for each content of the user, when the storage unit 520 stores PHT information 610 of a first end device, content information 620 of the first end device, PHT information 640 of a second end device, and content information 650 of the second end device.

The mapping unit 530 may determine the content information 620 of the first end device. The content information 620 of the first end device may include a device index 621 which is identical to a device index 611 of the PHT information 610 of the first end device.

Also, the mapping unit 530 may map a local storage address 612 of the PHT information 610 and a local storage address 622 of the content information 620, and determine playback information for each content in an end device. The playback information for each content in an end device may include a content file name 623 and a playback count 613 of content stored in the end device.

Also, the mapping unit 530 may generate or add playback information 630 for each content of the user based on the playback information for each content in an end device.

For example, in content 631 including the content file name 623 of 'AAA', a playback count 632 is set as 24 in the playback information 630 for each content of the user.

Accordingly, the mapping unit 530 may add the playback count 613 of '3' to the playback count 632 of '24' to change the playback count 632 to 27.

Also, the mapping unit 530 may determine the content information 650 of the second end device. The content information 650 may include a device index 651 which is identical to a device index 641 of the PHT information 640 of the second end device.

Also, the mapping unit 530 may map a local storage address 642 of the PHT information 640 and a local storage address 652 of the content information 650, and determine playback information for each content in an end device. The playback information for each content in an end device may include a content file name 653 and a playback count 643 of content stored in the device.

Also, the mapping unit 530 may generate or add the playback information 630 for each content of the user based on the playback information for each content in an end device.

For example, content 633 including the content file name 653 of 'BBB' is not stored in the playback information 630 for each content of the user. Accordingly, the mapping unit 530 may add the playback information for each content in an end device including the content file name 653 and the playback count 643. In this instance, a playback count 634 may be '3' which is identical to the playback count 643.

As described above, the system of collecting content playback information for each device of a user may collect information about content playback of each device of the user, and thereby may provide the user or a content provider with information about a playback count or a playback time for each content in an end device.

Also, when the user stores or deletes content by connecting the end device to a personal media station, information about playback of the collected content for each device may be stored in the personal media station, and the information for each content may be mapped. Accordingly, the user or the content provider may be provided with information about a playback count or a playback time for each content of the user.

Also, a server, providing content, may sort, combine, or map the information about the playback count or playback time for each content of the user. Accordingly, the content provider may be provided with statistics of the playback count or information about content provided for each user.

The above-described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An end device of collecting content playback information of a user, the end device comprising:
   a storage to store content and a table including playback history information of the content in a predetermined local storage address, the playback history information including at least a playback count;
   a control unit to retrieve content, selected by the user, from the storage, to load a storage address of the selected content, and to transmit the storage address to a decoder; and
   wherein the decoder is configured to store the storage address in the table, to change at least a playback count of respective playback information of the selected content, and to decode the selected content based on the storage address,
   wherein the end device downloads the content by synchronizing with a personal media station, in which a program configured to collect playback history information of contents is installed according to a permission of the user, and
   wherein the end device transmits the playback history information of the content from the storage to the personal media station which updates a content usage history for the end device based in part on the playback history information transmitted.

2. The device of claim 1, wherein the control unit is a firmware or a chipset.

3. The device of claim 1, wherein the storage address is a local storage address.

4. The device of claim 1, wherein the predetermined local storage address storing the table is set differently depending on a characteristic of the device.

5. The device of claim 1, wherein the playback history information further includes the storage address, transmitted to the decoder, a number of times that the storage address is transmitted, and information about a point in time the storage address is transmitted.

6. A method of collecting content playback information of a user implemented by an end device, the method comprising:
   downloading content by synchronizing with a personal media station, in which a program configured to collect playback history information of contents is installed according to a permission of the user;
   storing the content in a storage of the end device, and generating a table including playback history information of the contents in a predetermined local storage address, the playback history information includes at least a playback count;
   retrieving the content selected by the user, and loading a storage address of the selected content;
   transmitting the storage address of the selected content to a decoder;
   storing the storage address in the table, and changing at least a playback count of respective playback information of the selected content;
   decoding the selected content based on the storage address; and
   transmitting, to the personal media station, the playback history information of the content, wherein the personal media station is configured to update a content usage history for the end device based in part on the playback history information transmitted.

7. The method of claim 6, wherein the storage address is a local storage address.

8. The method of claim 6, wherein the predetermined local storage is set differently depending on a feature of a device.

9. The method of claim 6, wherein the playback history information further includes the storage address, transmitted to the decoder, a number of times that the storage address is transmitted, and a point in time that the storage address is transmitted.

10. A non-transitory computer-readable recording medium storing a program configured to implement a method of collecting content playback information of a user, the method comprising:
    downloading content by synchronizing with a personal media station, in which a program configured to collect playback history information of contents is installed according to a permission of the user;
    storing the content, and generating a table including playback history information of the contents in a predetermined local storage address, the playback history information includes at least a playback count;
    retrieving the content, selected by the user and loading a storage address of the selected content;
    transmitting the storage address of the selected content to a decoder;
    storing the storage address in the table, and changing at least a playback count of respective playback information of the selected content;
    decoding the selected content based on the storage address; and
    transmitting, to the personal media station, the playback history information of the content, wherein the personal media station is configured to update a content usage history for the end device based in part on the playback history information transmitted.

* * * * *